UNITED STATES PATENT OFFICE.

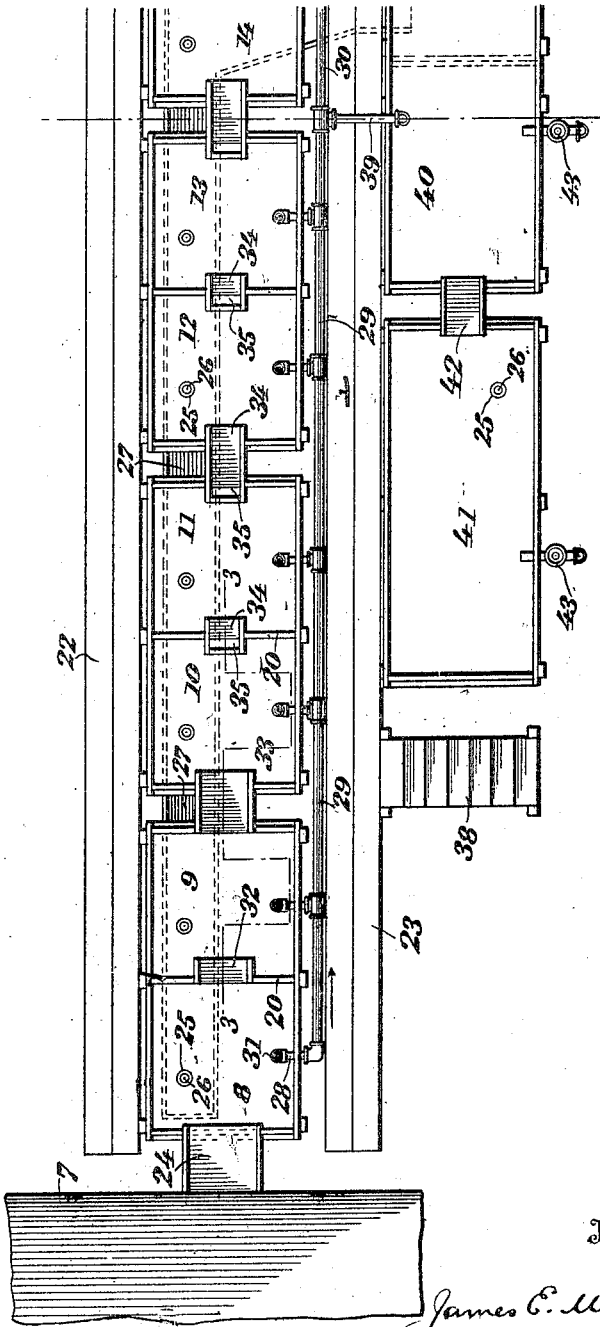

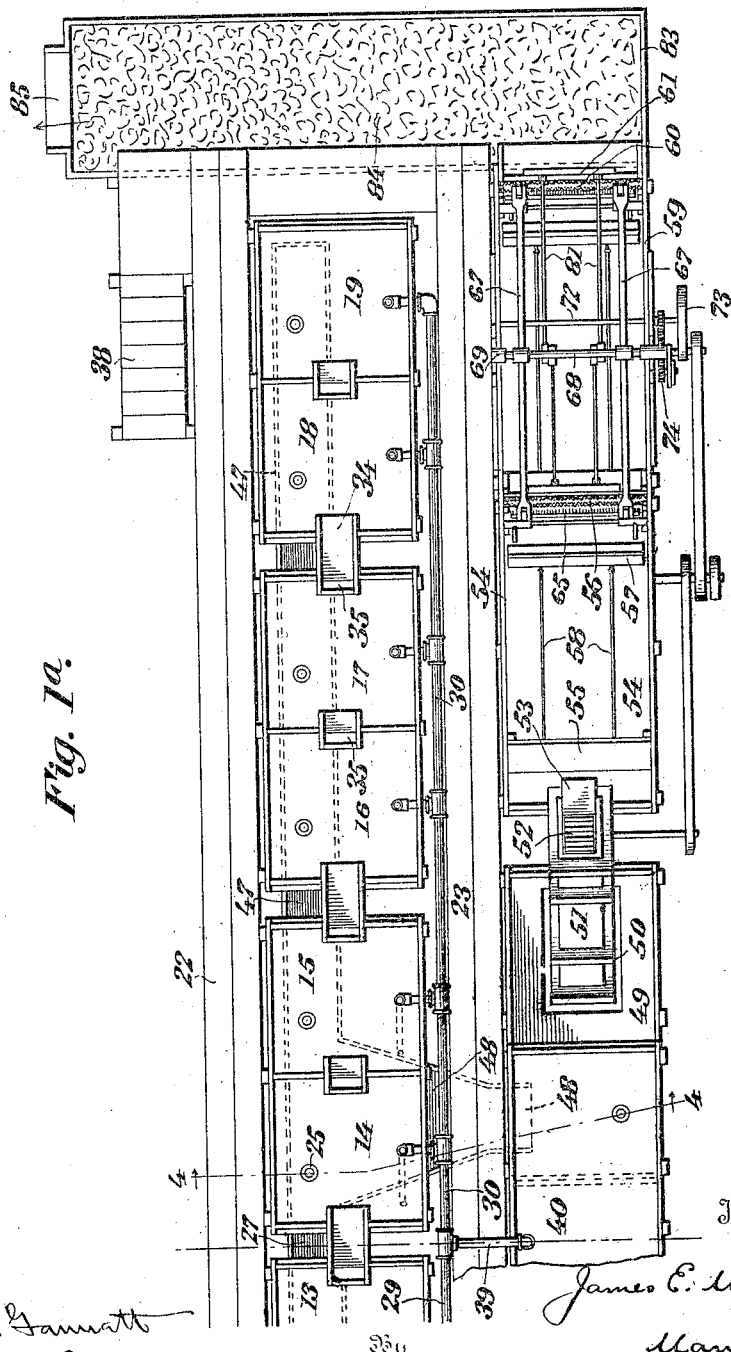

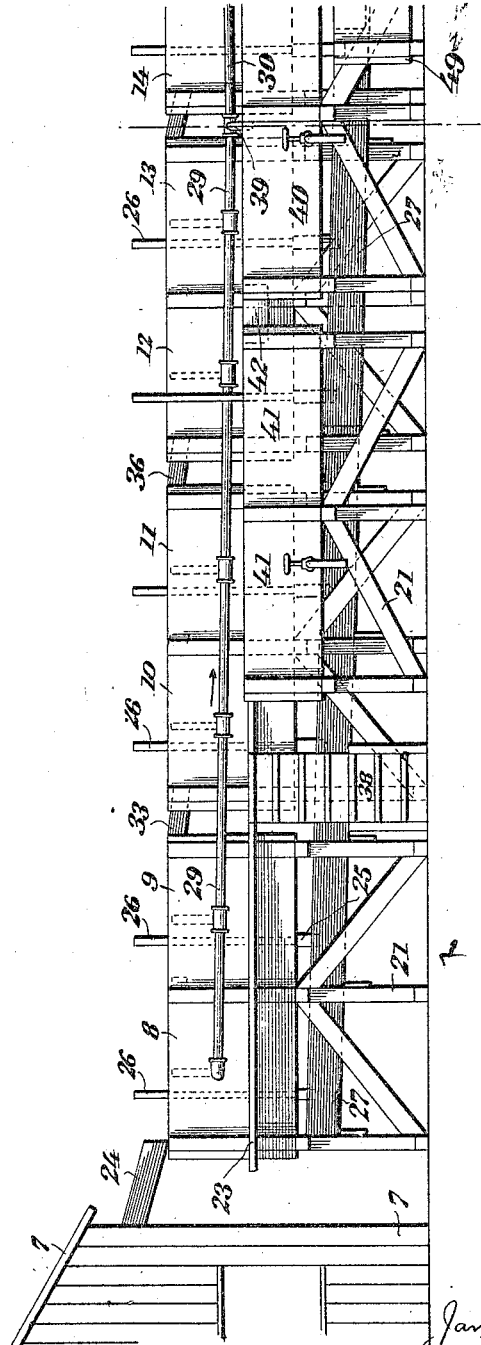

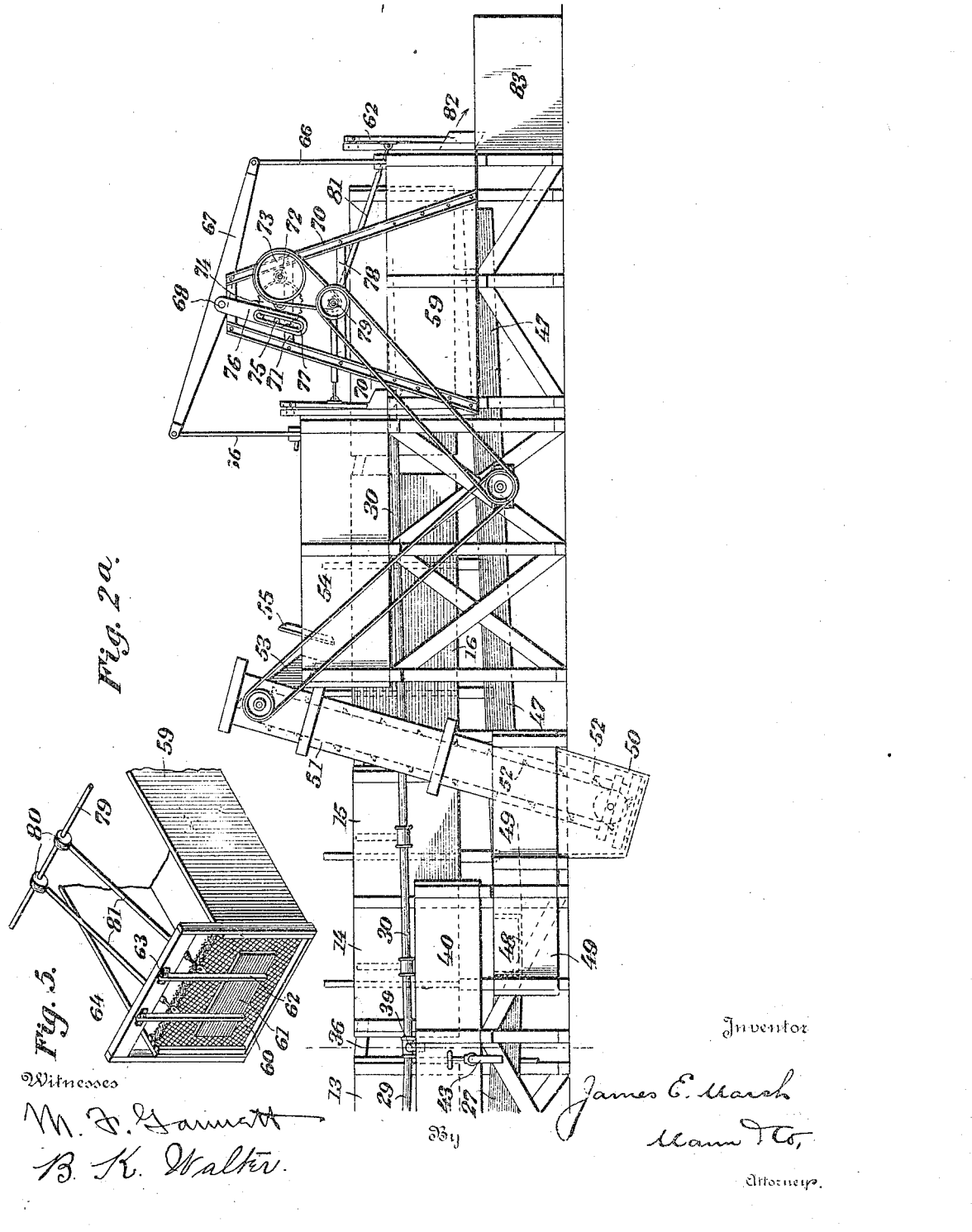

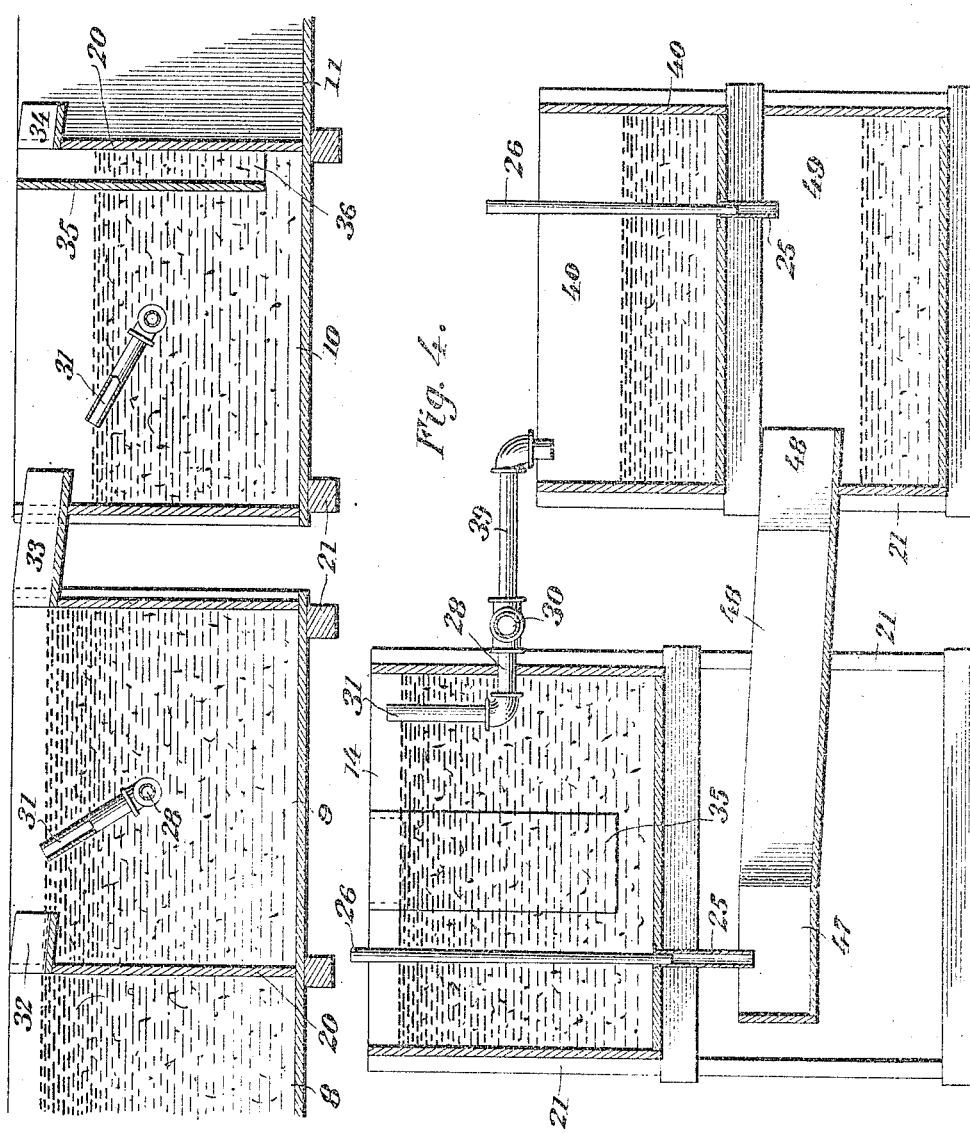

JAMES E. MARSH, OF REEDVILLE, VIRGINIA.

APPARATUS FOR SEPARATING OIL AND FISH-MEAT FROM WATER.

1,203,225.   Specification of Letters Patent.   Patented Oct. 31, 1916.

Application filed August 1, 1914. Serial No. 854,527.

*To all whom it may concern:*

Be it known that I, JAMES E. MARSH, a citizen of the United States, residing at Reedville, in the county of Northumberland and State of Virginia, have invented certain new and useful Improvements in Apparatus for Separating Oil and Fish-Meat from Water, of which the following is a specification.

This invention relates to a new and improved apparatus for use in the business of fishing for menhaden or alewife, which is largely conducted on the Atlantic coast, and in the waters of the Delaware, Chesapeake, and other bays. These fish are taken by huge nets and are carried by sail and steam vessels to the factories located on land, where the fish are converted into oil, fertilizer and other products. In this manufacture the fish are cooked, subjected to compression to express the water and oil from the meat and bone, and the solid part is usually subjected to further treatment, to extract the remaining oil, because the oil, as a separate product is more valuable than the same oil left with the meat.

In the present practice of the factories the oil and water that has been separated from the solid parts, contain many small particles of fish-meat possessing valuable nitrogenous matter; these small particles of fish-meat are lost by being carried off in the water that is discharged as waste. In the operation of a large factory the loss that occurs by this form of waste during a fishing season is very considerable.

The object of this invention is to provide an apparatus that will facilitate the operations of a fish factory in separating the oil and water and save from loss the numerous small particles of fish-meat that have heretofore gone to waste.

The invention is illustrated in the accompanying drawings in which—

Figure 1 is a top plan view of those settling tanks nearest the factory and also the oil-collecting tanks of the apparatus. Fig. 2 is a side elevation of the same part shown in Fig. 1. Fig. 1ª is a top plan view—being a continuation of the apparatus from the parts shown in Fig. 1 to its discharge end of the apparatus. Fig. 2ª is a side elevation of the same parts shown in Fig. 1ª. Fig. 3 is a vertical longitudinal section of the first three settling tanks shown in Fig. 1; the section being taken on the irregular broken line 3—3. Fig. 4 is a vertical cross-section of the apparatus taken on the line 4—4 of Fig. 1ª. Fig. 5 shows a knocker on the screen of the second residual tank.

Referring now to the drawing, the numeral 7, designates a part of the factory building; adjoining this building is a tank 8, elevated above the ground and supported on either walls or frame work. The tanks, in the present instance, are shown as double-tanks, that is, one tank-structure contains two chambers, 8 and 9, which are separated by a central partition 20. In the present instance twelve chambers are shown in the drawing numbered from 8 to 19. These tanks extend in a row or line and their supports are designated 21.

Two longitudinal elevated platforms 22, 23, extend alongside of the row of tanks,— one platform being at each of the two sides. These platforms enable the workmen to pass along and look into the tanks and inspect the operations, tilt the skimmer pipes, and insert and remove the draw-off plugs.

The operation of compressing the cooked fish is done in the building 7, and the water and oil that has been expressed, together with millions of small particles of fish-meat in this liquid flows over a sluice-way 24, into the first tank 8.

Each tank in its bottom has a discharge pipe 25, and said pipe is closed by a plug 26, whose lower end enters the discharge pipe, and the plug is long enough for its upper end to project above the wall of the tank. A workman on the platform may grasp the upper end of the plug at the proper time and withdraw it to enable the liquid and the particles of fish-meat in the tank to discharge into the downward inclined conduit 27, extending along and below the row of tanks.

Extending through its side wall each tank has a branch-pipe, 28, which on the exterior of the tank connects with a nearly horizontal but slightly downward inclined pipe 29.

On the inner side of each tank is a jointed draw-off pipe 31, whose lower end connects with the said branch-pipe 28; this pipe 31, is capable of standing vertically as in Fig. 4, or of tilting to one side, as in Fig. 3. When the pipe 31 has the vertical position, its upper open end will be high enough to project above the high stage of the liquid in the tank; when a workman tilts the pipe the effect is to lower its upper open end and allow the oil on the surface to be skimmed by entering the open end of the pipe 31 and flow off into the exterior pipe 29, and this oil moves in the direction of the dart; the further action of this pipe will be explained presently.

The top of the partition 20, that separates the two tanks, 8 and 9, has a sluice-way 32, over which the surface liquid will flow to the next tank 9; this action of the oil and water flowing from the top of tank 8, to the next tank 9, will go on during the run of the factory for a certain period, say one day's work, until all the tanks become filled. When the operation of the factory for the day ceases, the settling of the particles of fish-meat and the rising of the globules of oil will begin.

It is to be understood that the settling process results in the oil coming to the surface, and below the oil the liquid is water, and at the bottom of the tank the small particles of fish-meat will settle, and can be drawn off by bottom pipe, 25, into the conduit, 27.

From the tank 9, a sluice-way 33, bridges over to the next tank 10, and the liquid in tank 9 will flow to said tank 10. Commencing with tank 10, provision is made for baffling the oil, that may be at the top surface of the liquid in said tank from flowing over the sluice-way 34, into the next tank which in this case is tank 11. This baffle consists of a vertical box flume 35, shown in tank 10, at the partition 20, which separates tank 10, from tank 11. This flume is shown in Figs. 1, 3 and 4. Said vertical flume is open at the bottom 36, and its walls extend to the top edge of the tank, three of its walls at their upper end inclose one end of the sluice-way 34. The flume passage at its top end directly communicates with the sluice-way 34, and permits liquid to pass to tank 11. This baffle and flume structure prevents the oil that is on the top surface of the liquid in tank 10, from gaining access to the sluice-way, but permits the watery liquid in tank 10, to enter the open bottom 36, of the flume and pass upward to said sluice-way 34, and then into tank 11, of course, some of the particles of fish-meat may pass with the liquid through the flume to the next tank.

All the other sluice-ways 34 of the apparatus after the one leading from tank 10, are provided with a vertical flume 35, to prevent the oil from passing to the next adjoining tank.

Every tank after tank 10, has a discharge pipe 25; a plug 26; a branch-pipe 28, in the side wall of the tank; a jointed or skimming draw-off pipe 31, and a flume 35.

A sluice-way 34, connects tanks 11 and 12; the settling tanks are filled in succession commencing at tank 8, and proceeding to the last tank 19. Steps 38, lead from the platform 22, to the ground and other steps 38, lead from the other platform 23, to the ground.

The oil pipe 29, inclines downward from the first settling tank, 8, to the tank 13, and conducts oil; the pipe 30, inclines from the last tank 19, to the tank 14, and also conducts oil. Midway of the first and last tanks, 8—19, these two pipes at 39, connect with an oil-storage tank 40, and thus the oil from all the settling tanks is collected. A second oil storage tank 41, adjoins the first tank 40, and the two storage tanks are connected by a sluice-way 42, in order that oil may flow from the first storage tank to the second. Each storage tank has a draw-off spigot 43.

The remnant receiver tank 49, comprises a rectangular portion that is above the surface of the ground and a depressed portion 50, that extends down below the surface of the ground.

The two conduits, 27—47, which are below the row of twelve settling tanks, incline downward toward the center of the row, and at the center the low ends of the two conduits merge into a lateral conduit 48, whose end enters the said receiver 49. See Figs. 1ª and 4.

A plan view of this receiver is shown in Fig. 1ª, and a side elevation in Fig. 2ª; it will be seen in the plan view that the dimension of the cross-width of the depressed part 50, is less than the dimension of the cross-width of the upper or rectangular portion 49.

If any water or oil is in the receiver it is sure to be found in the depressed part 50.

A liquid elevator of the well-known endless-chain type, has the lower end of its case 51, in the said depressed part, and stands in a vertically inclined position, its top projecting higher than the settling tank 16. Within this inclined case 51, are bottom and top pulley-wheels or rollers indicated in broken lines, and an endless-chain passes over said pulley-wheels. The chain is provided with a number of cups 52; as the chain travels the said cups in succession fill with the residual liquid (water, oil and small particles of fish-meat) that is in the depressed part 50, and the filled cups are carried up within the case to the top, where the liquid contained in the cups is dumped and caught by the lateral spout 53, whose discharge end projects sidewise from the elevator case 51.

Two residual tanks 54, 59 are employed; the first residual tank 54, has position somewhat higher than the height of the row of settling tanks, and the second tank 59, is lower so that liquid in the first one may flow into the second one. The liquid elevator spout 53, discharges the residual liquid into the first tank 54. To prevent this stream of liquid from agitating the residual liquid already in said tank 54,—such agitation producing an objectionable foam or froth,— I provide the tank with an inclined plate or board 55, against which the said discharging stream of liquid will strike. This inclined board causes the stream to break up and the broken parts of the stream to be deflected, with the result that the liquid discharging from the spout 53, quietly mingles with the bulk of liquid already in the first tank and thereby the formation of objectionable foam or froth is avoided.

The residual liquid that reaches the first tank 54, has more or less objectionable foreign material, such as small sticks, leaves other forms of vegetable matter and trash; this trash generally floats on the surface, and I provide means to keep said trash from lodging against the vertical screen 56, which strains the liquid that flows into the second and lower tank 59.

At the right-hand end of the first residual tank 54, is a vertical sheet of woven wire that serves as the said screen 56, to strain the liquid; there may be one or two screens at this end of the tank 54. The movement of the liquid in the first residual tank 54, is toward the screen 56.

The trash arrester comprises a wood bar 57, that extends crosswise of the residual tank 54, and the said bar floats on the surface of the liquid in front of the said screen 56; as the depth of the liquid in this tank varies from time to time, the floating bar 57, is held by two parallel cords 58, that are attached to the bar and also attached to some suitable stationary part, such for instance, as the inclined board 55. The trash referred to, lodges against the floating bar 57, and not against the screen 56, and a workman with his hands may occasionally remove the accumulated trash caught by the said bar. The second tank 59, also has a screen 60, at its right-hand end as shown in Fig. 1ª, and in Fig. 5, and is further provided with a trash arrester 57.

It has been found that the numerous small particles of fish-meat in a state of suspension in the liquid, lodge against the said vertical woven-wire screens and accumulate and if not loosened and removed would soon completely close the mesh or openings of the screen, and thus stop the passage of the liquid. To overcome this serious difficulty I have provided two instrumentalities. The first is a movable brush, and the second is termed a "knocker."

The vertically-movable brush is not herein claimed, because it is the subject of a pending application for patent.

The knocker comprises a board or plate 61, hung by two vertical rods 62, whose upper ends are secured by pivots 63, to a horizontal bar 64, that extends crosswise of the residual tank. This hanging board or plate is quite near the vertical screen 60, and is free to vibrate or swing so as to strike or knock said screen making frequent light blows as might be made by a hammer, which cause the screen to be jarred, and thereby the small particles of fish-meat are dislodged.

The mechanism to impart motion to the vertically-movable brushes, and to the vibrating knockers, see Figs. 1ª and 2ª, will now be briefly described; but the said brushes and their operative mechanism are not the subject of the claims in the present case.

The brush comprises bristles or teeth fixed on a bar 65, that extends horizontally across the tank and which is carried or sustained at the lower ends of two pendant rods, 66, each of which latter has its upper end jointed to a rocking beam 67, and said two rocking beams are both supported on a rockshaft 68, which fits in bearings 69, at the top of a loose-frame 70. Said frame consists of two inclined standards at each longitudinal side of the second residual tank 59.

Below the top bearing 69, at each side of the tank 59, is a horizontal bar 71, and a drive shaft 72, turns in bearings that rest on said bar; said drive-shaft has a pulley 73, and also a pinion that meshes with a gear wheel 74, which latter carries a crankpin 75. Rigidly fixed on the rock-shaft 68, is an arm 76, which extends downwardly; this arm has a slot 77, into which the said crank-pin projects.

When rotary motion is imparted to the drive-shaft 72, the said gearing and the crank-pin 75, will give a swinging movement to the arm 76, which will rock the shaft 68, and cause the beam 67, to rock or vibrate in a vertical plane and thereby the pendant rods 66, will move the said brushes up and down.

A second horizontal bar 78, at each side is below the said brush-moving mechanism, and this bar supports bearings for a revoluble shaft 79, which carries two eccentrics, 80, to each of which one end of a rod 81, is attached, the other ends of said rods being connected with the hanging knocker board or plate 61; the revolution of the eccentric shaft 79, will cause the said knocker board to vibrate or swing against the screen 60, and thus jar the latter and dislodge therefrom the small particles of fish-meat.

It should be stated that each of the two residual tanks 54 and 59, has a vertical screen at its discharge end, a brush that moves vertically and which on its downward movement scrapes over the surface of said screen, an arrester to stop trash floating on the surface of liquid in each tank, and a knocker to jar the screen and cause the small particles of fish-meat to dislodge from the screen.

The liquid that discharges from the second residual tank 59, at the point indicated by the dart 82, will have been screened twice. This liquid may still contain some oil and also minute particles of fish-meat, in order to save these I provide a tank 83, that is placed so as to receive the liquid discharged at the said dart 82. This tank contains suitable absorbent or spongy material 84, such as coke, and the oil and fine particles of meat will be absorbed by the said spongy material while the water will run off at the tank end 85. The coke or other absorbent material having become charged with nitrogenous matter will be dried and when crushed into a granular or powdered form is valuable as a fertilizer. Much of this finely divided fish-meat will have been left resting on the bottoms of the settling tanks and manually recovered therefrom by the workmen with shovels after drawing off the oil from the surface of the liquid and then drawing off the water from the said tanks; but a considerable quantity of the fine particles of meat will still remain in the residual liquid that reaches the tanks 54 and 59.

Having described my invention what I claim is,—

1. In an apparatus for separating oil and small particles of fish-meat mixed with liquid as the latter comes from the factory, the combination of a plural number of settling tanks to receive the factory liquid comprising oil, water and small particles of fish-meat; a sluice-way 33 connecting every two adjoining tanks at the top of their walls over which sluice-way the said liquid may flow from one tank to the next tank in the row; an inclined conduit 27 extending continuously along and below all of said plural number of tanks said conduit to carry off water and particles of fish meat; a pipe opening through the bottom of each of said tanks and discharging into said conduit; means to control each of said discharge pipes; a downwardly-inclined pipe 29 extending along the exterior sides of said row of tanks to carry off oil; and an upward-projecting skimmer pipe 31 within each of said tanks and adapted to draw-off oil from the upper surface of said liquid and each of said skimmer pipes connected with the said exterior downwardly-inclined pipe.

2. In an apparatus for separating oil and fish-meat from liquid, the combination of a plural number of independent settling tanks to receive the liquid comprising oil, water and small particles of fish-meat; a sluice-way at the top of the walls of every two adjoining tanks over which sluice-way the said liquid may flow from one tank to the next tank; and a baffle flume within one tank and having an inlet opening at or near its bottom and said flume extending upward and at its top connecting with said sluice-way so that liquid from the bottom of the tank may pass up the flume and discharge into the sluice-way.

3. In an apparatus for separating oil and fish-meat from liquid, the combination of a plural number of independent settling tanks to receive the liquid comprising oil, water and fish-meat said tanks being in a row one after the other; means whereby the liquid of one tank may flow or pass therefrom into the top of the next adjoining tank; a tank 40 to receive oil separated from the liquid in the several settling tanks; a rectangular tank 49 above the surface of the ground to receive the remnant liquid of the several settling tanks and said tank having a depressed portion 50 which is below the surface of the ground; a residual tank 54 that has position higher than the height of the row of settling tanks; and a liquid elevator having its lower end in the said depressed portion of the remnant liquid tank and lifting the liquid therein and discharging it into the said higher tank 54.

4. In an apparatus for separating oil and fish-meat from liquid, the combination of a plural number of independent settling tanks for liquid comprising water and oil and said tanks extending in a row one after the other; a residual tank 54 that has position higher than the said row of settling tanks and provided at its interior with an inclined board extending crosswise; and a liquid elevator having at its top a lateral spout that discharges the liquid against the said inclined board and the lower end of said elevator operatively in connection with one of the settling tanks.

In testimony whereof I affix my signature in presence of two witnesses.

JAMES E. MARSH.

Witnesses:
  F. M. AMESCOESETEY,
  HARRY WATERS.